United States Patent
Hsieh

(10) Patent No.: US 7,317,156 B2
(45) Date of Patent: Jan. 8, 2008

(54) FOLDING STAND FOR A MUSICAL INSTRUMENT

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 595 days.

(21) Appl. No.: 10/990,962

(22) Filed: Nov. 18, 2004

(65) Prior Publication Data

US 2006/0101982 A1    May 18, 2006

(51) Int. Cl.
*G10D 7/10* (2006.01)
(52) U.S. Cl. .................................... 84/387 A
(58) Field of Classification Search ............... 47/40.5; 81/453, 421, 387 A, 385 A; 248/176.1, 166, 248/170, 168, 528, 173, 150, 151, 529, 525, 248/460, 443
See application file for complete search history.

(56) References Cited

U.S. PATENT DOCUMENTS 3,637,070 A * 1/1972 Friedman ................... 206/314
4,738,180 A * 4/1988 McKnight ................ 84/385 A

* cited by examiner

*Primary Examiner*—Kimberly Lockett
(74) *Attorney, Agent, or Firm*—Fei-Fei Chao; Andrews Kurth, LLP

(57) ABSTRACT

A folding stand for a musical instrument includes a cone-like seat having a tapered top. Multiple first slots are radially defined through the seat. A chamber is defined at a bottom side and communicates with the first slots. Multiple grooves are radially defined at the bottom side and alternately between the first slots and communicate with the chamber. A joint is rotatably mounted in the chamber. Multiple second slots are radially defined through the joint and respectively aligned with the first slots in a folded status and aligned with the grooves when the joint is turned in an unfolded status. Multiple legs are respectively and pivotally mounted in the second slots and received in the first slots in the folded status. Whereby, the legs can be folded into the seat, so the stand can be received in a bell-like portion of a musical instrument for convenient transportation.

4 Claims, 10 Drawing Sheets

FOLDING STAND FOR A MUSICAL INSTRUMENT

BACKGROUND OF THE INVENTION

1. Field of the Invention

The present invention relates to a folding stand, and more particularly to a folding stand for supporting a musical instrument with a bell-shaped portion.

2. Description of Related Art

With reference to FIG. 10, a musical instrument with a bell-shaped portion (30) such as trumpet, trombone, French horn etc. is supported on a conventional stand (5).

The stand (5) has a base (50) with a plurality of legs (51) laterally extending outwards. A support bar (52) extends upwards from the base (50), and a seat (53) is provided on the support bar (52). A musician can temporarily put the musical instrument on the stand in order to take a rest However, the support bar (52) has a large size and can not be received in a box along with the musical instrument.

Other conventional stands (not shown) may have a support bar pivotally mounted on the base, or legs threadingly and detachably mounted on the base, or even legs telescopically mounted on the base. However, the stand still is large in size and can not be received in the box along with the musical instrument.

Therefore, the invention provides a stand for a musical instrument to mitigate or obviate the aforementioned problems.

SUMMARY OF THE INVENTION

The main objective of the present invention is to provide a folding stand for a musical instrument that has a compact size for being received in a box along with the musical instrument.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
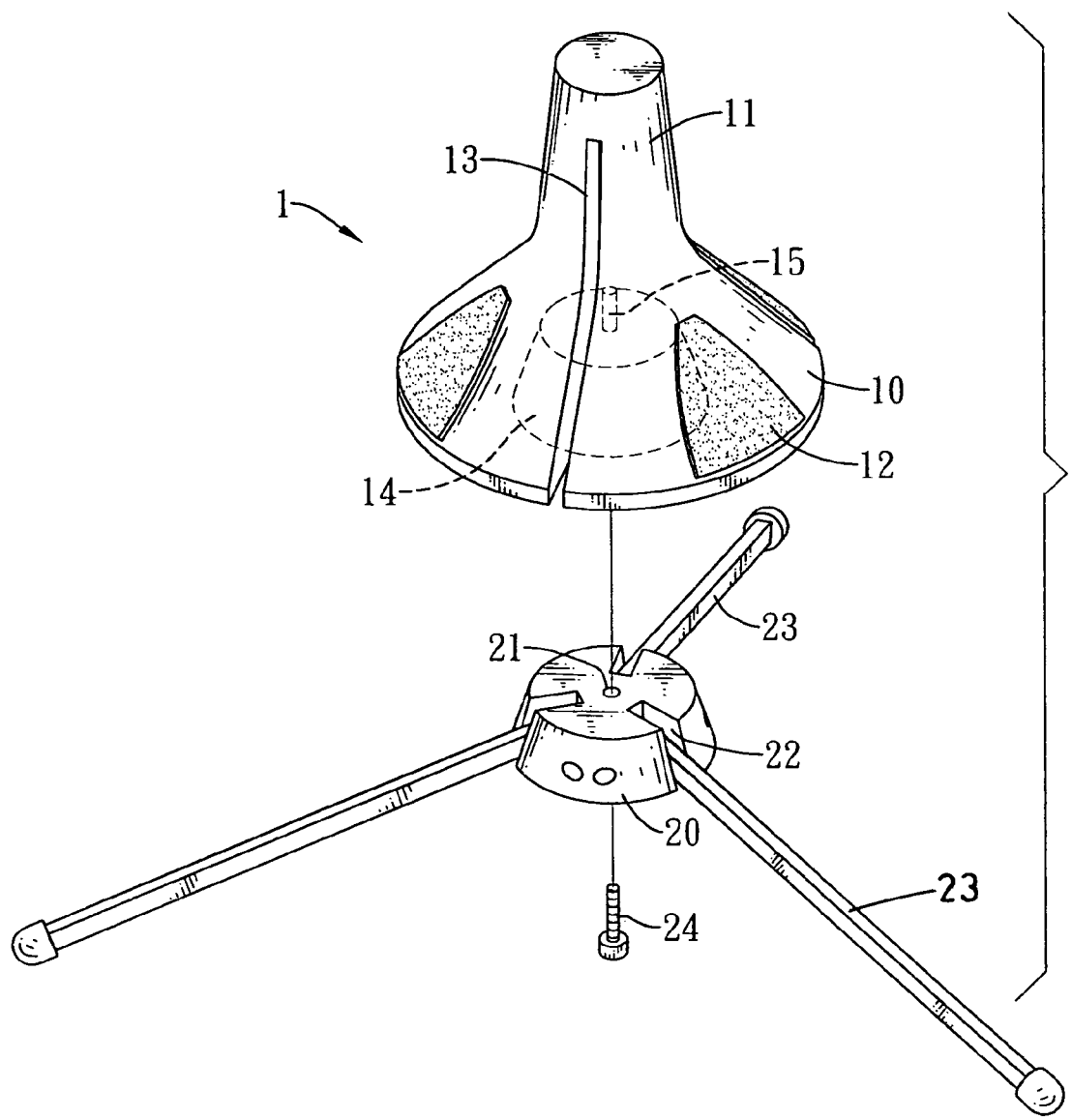
FIG. 1 is an exploded perspective view of a folding stand in accordance with the present invention.
Figure 2:
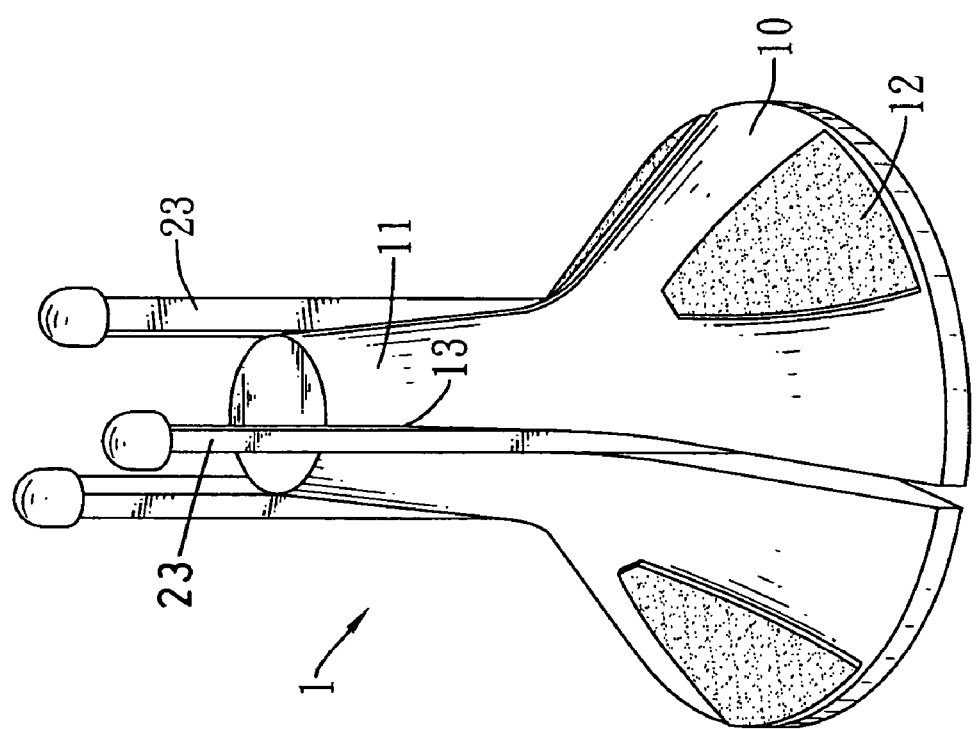
FIG. 2 is a perspective view of the folding stand in a folded status.
Figure 3:
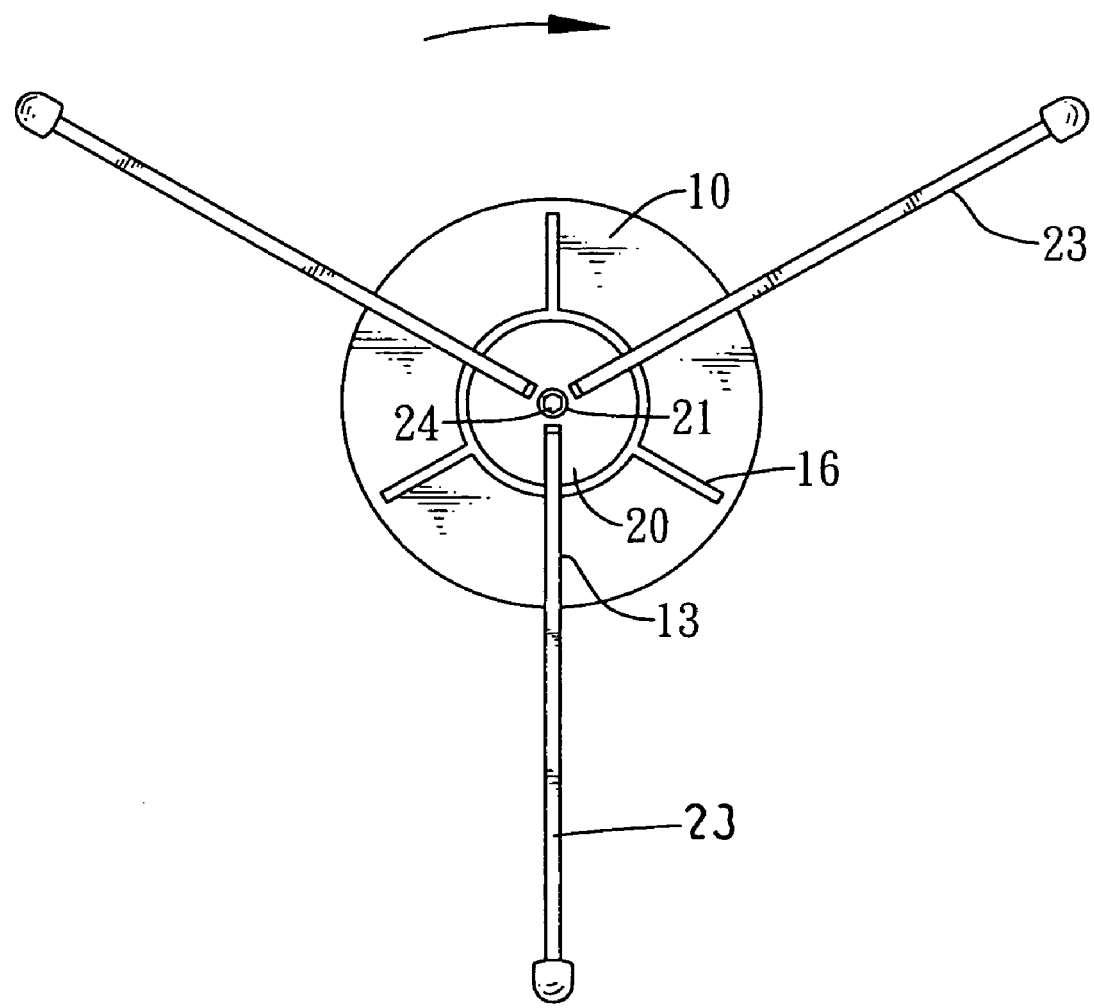
FIG. 3 is a bottom view of the folding stand in an unfolded status.

With reference to FIGS. 1-6, a folding stand (1) in accordance with the present invention has a cone-like seat (10) with a tapered top (11). Multiple first slots (13) are radially defined from an outer periphery to a bottom side of the seat (10). A chamber (14) is defined at the bottom side of the seat (10) and is in communication with the slots (13). A threaded hole (15) is defined in a bottom of the chamber (14). Multiple grooves (16) are radially defined from the bottom side of the seat (10) and alternately between the first slots (13), and in communication with the chamber (14).

Figure 4:
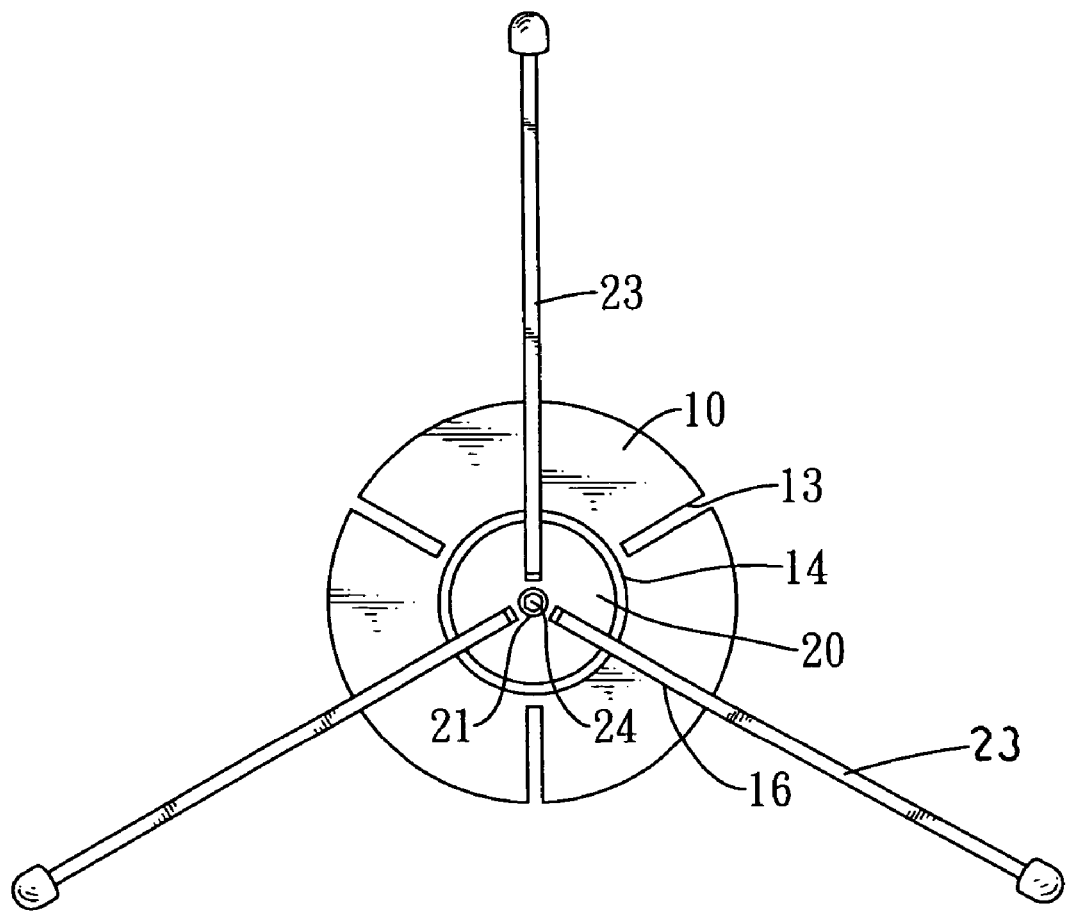
FIG. 4 is another bottom view of the folding stand in the unfolded status.

A joint (20) is rotatably mounted in the chamber (14) of the seat (10) by a screw (24) inserted through a hole (21) of the joint (20) and engaged in the threaded hole (15) of the seat (10). Multiple second slots (22) are radially defined through the joint (20), and multiple feet (23) are respectively and pivotally mounted in the second slots (22). The second slots (22) can be respectively aligned with the first slots (13) or the grooves (16) when the joint (20) is turned about the seat (10). For avoiding the interference between the legs (23) and the seat (10), the joint (20) is slightly movable along the screw (24) to separate the legs (23) from the first slots (13) for the rotation. When the legs (23) are turned to align with the grooves (16) and the folding stand is placed on the ground, the legs (23) can be positioned in the grooves (16), as shown in FIGS. 4-5.

Figure 5:
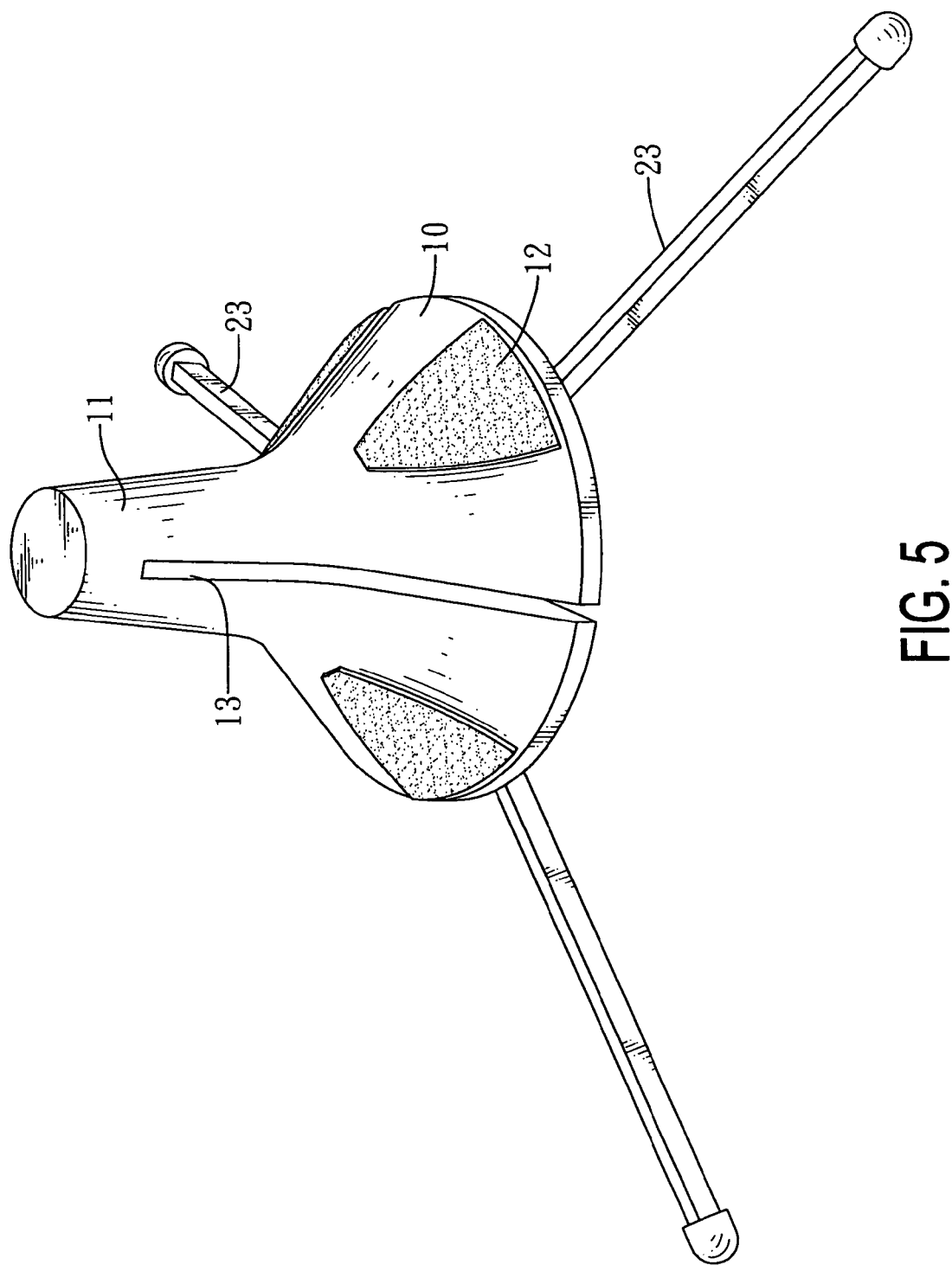
FIG. 5 is a perspective view of the folding stand in the unfolded status.
Figure 6:
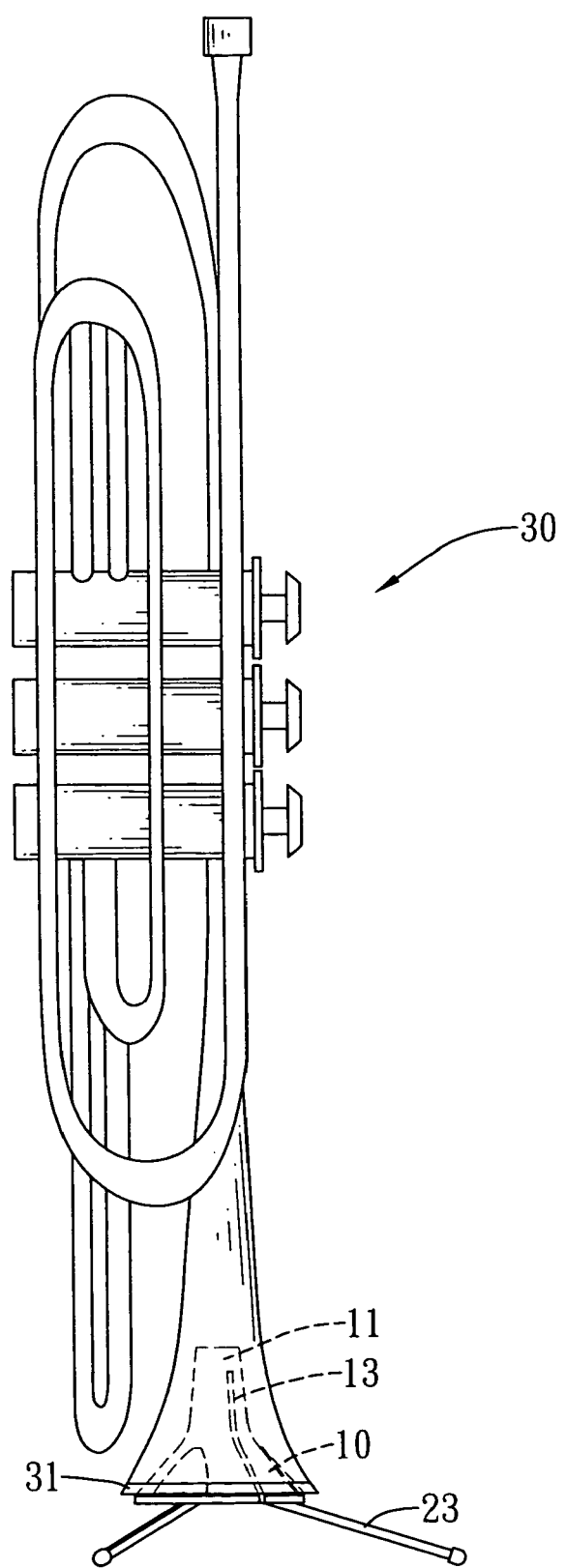
FIG. 6 is a schematic view of a musical instrument supported by the folding stand of the present invention.
Figure 7:
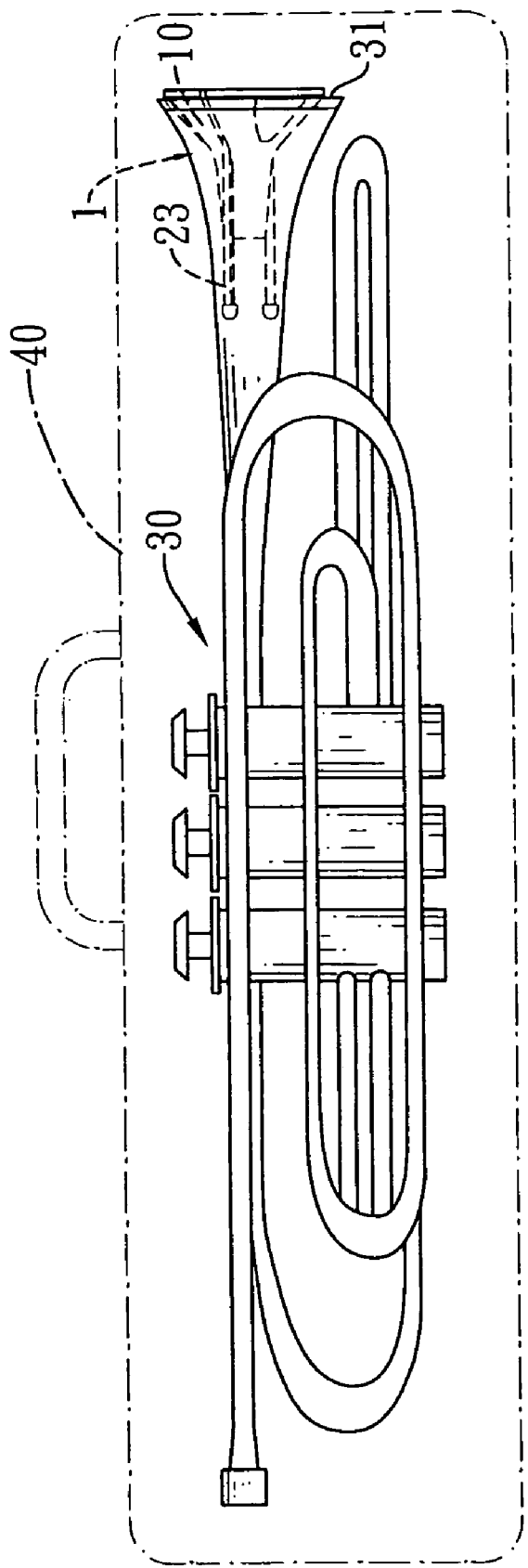
FIG. 7 is a schematic view of the musical instrument along with the folding stand received in a box.

A musical instrument (30) can be supported on the stand by a bell-like portion (31) being positioned on the seat (10), as shown in FIGS. 5 and 6. With further reference to FIG. 7, the legs (23) are pivoted upwards to locate in the respective first slots (13) and are received in the bell-like portion (31) along with the seat (10). Therefore, the folding stand and the musical instrument are both received in a box for convenient transportation.

Figure 8:
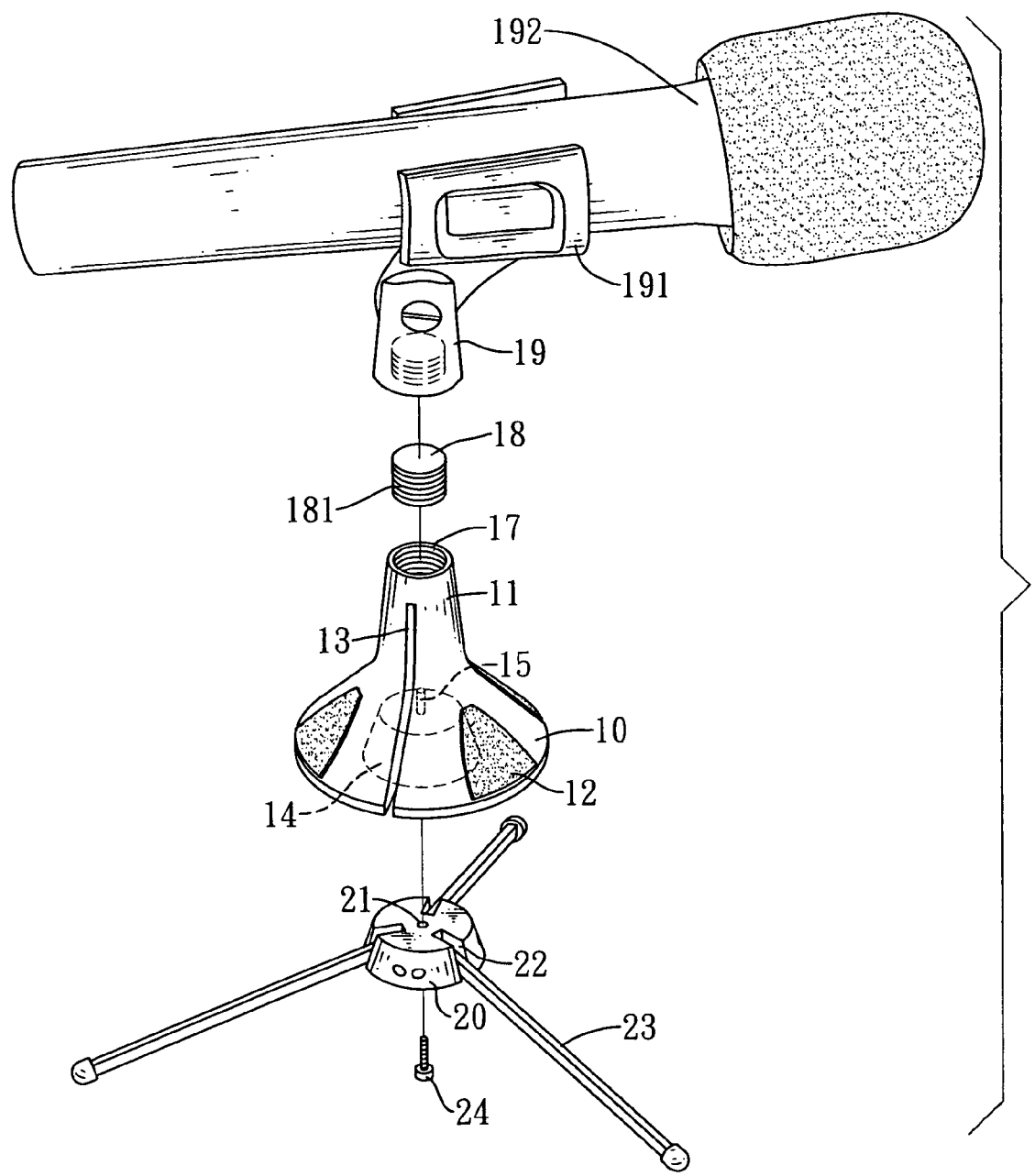
FIG. 8 is an exploded perspective view of a microphone supported on the folding stand of the present invention.
Figure 9:
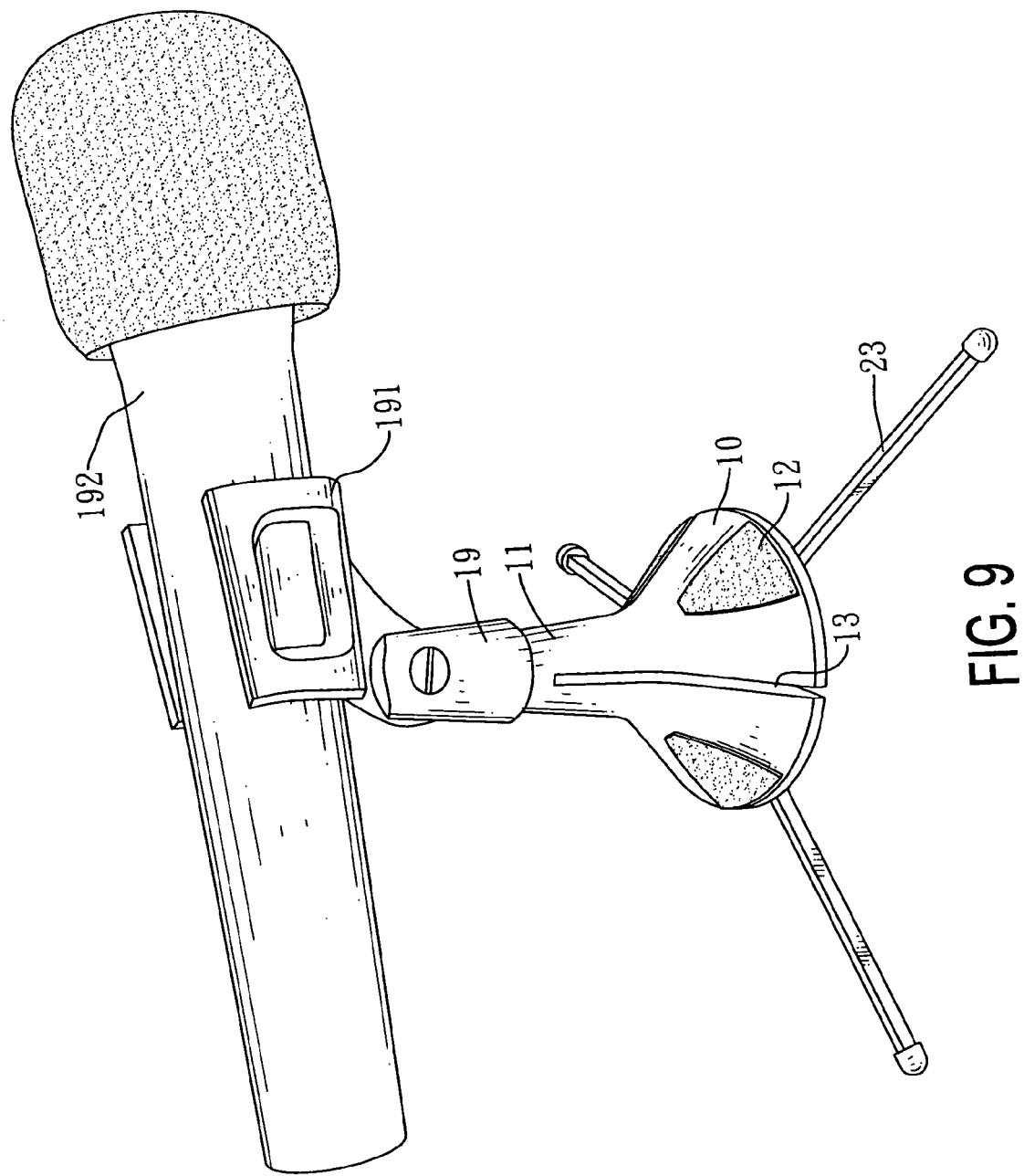
FIG. 9 is a perspective view of the microphone supported on the stand.
Figure 10:
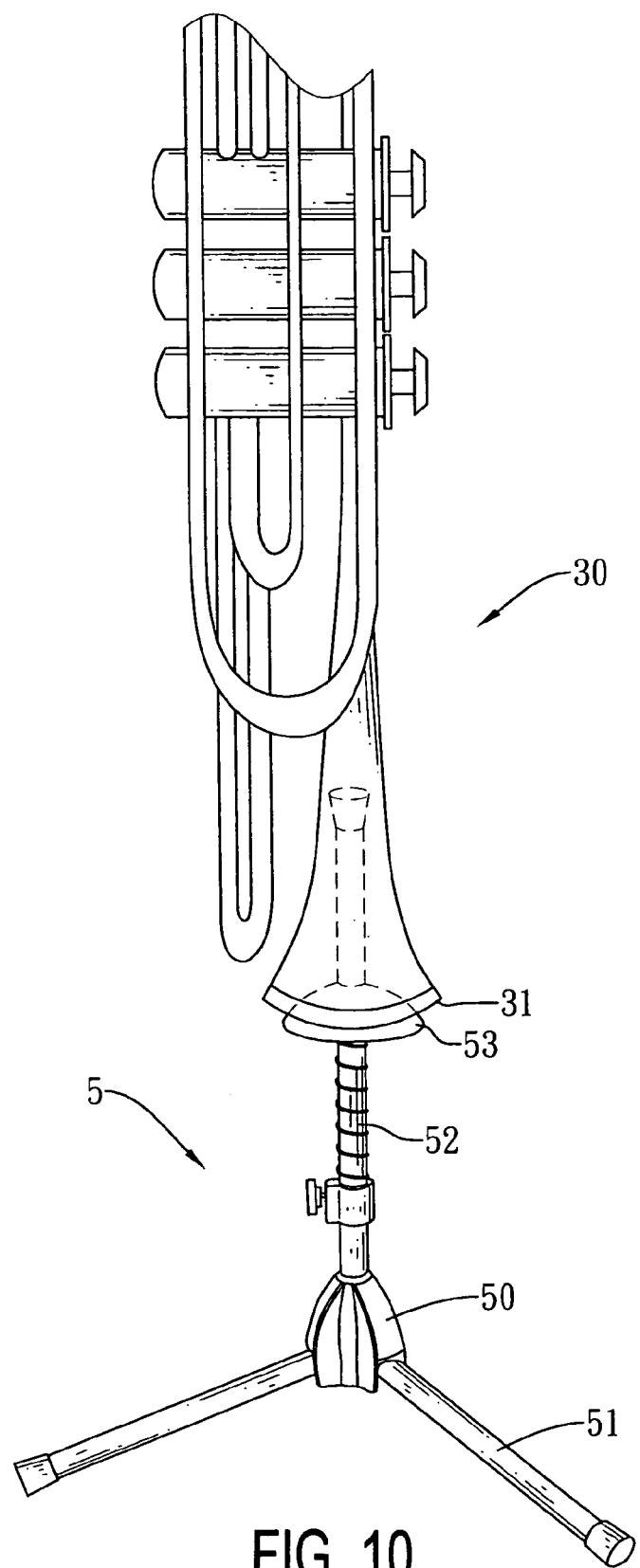
FIG. 10 is a schematic view of a conventional stand for supporting a musical instrument.

With reference to FIGS. 8-9, in another embodiment, the folding stand can be used for supporting a microphone (192). The seat (10') has an internal threaded part (17) formed at the top (11) thereof, and a rod (18) with an external threaded part (181) is engaged in the top (11). A cap (19) is threadingly provided outside the rotating head (18), and a bracket (191) is formed on the cap (19). The microphone (192) is positioned in the bracket (191).

According to the present invention, the folding stand has legs foldable into the seat to minimize the overall size, so it can be received in a bell-like portion of a musical instrument for convenient transportation. Moreover, the folding stand can be used for positioning a microphone.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A folding stand comprising:
   a cone-like seat (10) having a tapered top (11), multiple first slots (13) radially defined from an outer periphery to a bottom side of the seat (10), a chamber (14) defined at the bottom side and in communication with the first slots (13), and multiple grooves (16) radially defined at the bottom side and alternately between the first slots (13) and in communication with the chamber (14); and a joint (20) rotatably mounted in the chamber (14), the joint (20) having multiple second slots (22) radially defined through the joint (20) and respectively aligned with the first slots (13) in a folded status and aligned with the grooves (16) in an unfolded status, and multiple legs (23) respectively and pivotally mounted in the second slots (22) and received in the first slots (13) in the folded status.

2. The folding stand as claimed in claim 1, wherein the seat (10) has a threaded hole (15) defined in a bottom of the chamber (14), and the joint (20) is installed in the chamber (10) by a screw (24) extending through a hole (21) of the joint (20) and engaged in the threaded hole (15) and is slightly movable along the screw (24) to separate the legs (23) from the first slots (13) for rotation of the joint (20).

3. The folding stand as claimed in claim 1, wherein the seat (10) has a bracket (191) mounted at the top for supporting a microphone.

4. The folding stand as claimed in claim 3, wherein the seat (10) has an internal threaded part (17) formed at the top (11), a rod (18) with an external threaded part (181) engaged in the top (11), and a cap (19) threadingly mounted outside the rod (18), and the bracket (191) is mounted on the cap (19) for supporting the microphone.

* * * * *